United States Patent
Nozue et al.

(10) Patent No.: US 8,420,741 B2
(45) Date of Patent: *Apr. 16, 2013

(54) ETHYLENE BASED POLYMER COMPOSITION AND FILM

(75) Inventors: Yoshinobu Nozue, Ichihara (JP); Yasutoyo Kawashima, Ichihara (JP); Katsuhiro Yamada, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/599,080

(22) PCT Filed: May 15, 2008

(86) PCT No.: PCT/JP2008/059402
§ 371 (c)(1),
(2), (4) Date: Dec. 24, 2009

(87) PCT Pub. No.: WO2008/143305
PCT Pub. Date: Nov. 27, 2008

(65) Prior Publication Data
US 2010/0240835 A1    Sep. 23, 2010

(30) Foreign Application Priority Data
May 18, 2007  (JP) ................. 2007-132616

(51) Int. Cl.
*C08L 23/00* (2006.01)
*C08L 23/04* (2006.01)

(52) U.S. Cl.
USPC .......................... 525/240; 525/191

(58) Field of Classification Search ............ 525/191, 525/240
See application file for complete search history.

(56) References Cited

U.S. PATENT DOCUMENTS

| | | | |
|---|---|---|---|
| 6,225,410 B1 | 5/2001 | Sugimura et al. | |
| 8,076,418 B2 * | 12/2011 | Nozue et al. | 525/191 |
| 2001/0053831 A1 | 12/2001 | Ohno et al. | |
| 2002/0055592 A1 | 5/2002 | Johoji et al. | |
| 2003/0229182 A1 * | 12/2003 | Alarcon et al. | 525/191 |
| 2004/0210004 A1 | 10/2004 | Takahashi et al. | |
| 2006/0036039 A1 * | 2/2006 | Alarcon et al. | 525/191 |
| 2007/0083009 A1 * | 4/2007 | Chai | 525/240 |

FOREIGN PATENT DOCUMENTS

| | | |
|---|---|---|
| JP | 08003382 A | 1/1996 |
| JP | 2000178383 A | 6/2000 |
| JP | 2002-155212 A | 5/2002 |
| JP | 2002-179856 A | 6/2002 |
| JP | 2002-294007 A | 10/2002 |
| JP | 2004-359911 A | 12/2004 |
| JP | 2006-161059 A | 6/2006 |
| JP | 2006274159 A | 10/2006 |
| JP | 2006274160 A | 10/2006 |
| JP | 2007-023229 A | 2/2007 |
| JP | 2007-051283 A | 3/2007 |
| WO | 98/06781 A1 | 2/1998 |

OTHER PUBLICATIONS

JP 2007023229 Machine translation.*
JP 2007051283 Machie translation.*
Bremner et al., "Melt Flow Index Values and Molecular Weight Distributions of Commercial Thermoplastics," pp. 1617-1627, vol. 41, Journal of Applied Polymer Science, 1990.

* cited by examiner

Primary Examiner — Irina S Zemel
Assistant Examiner — Jeffrey Lenihan
(74) Attorney, Agent, or Firm — Sughrue Mion, PLLC

(57) ABSTRACT

An ethylene based polymer composition comprising the following component (A) and the following component (B) wherein the content of the component (B) is 0.1 to 20 parts by weight per 100 parts by weight of the component (A):
Component (A): an ethylene-α-olefin copolymer satisfying all of the following requirements (a1) to (a3):
 (a1) the density is 890 to 925 kg/m$^3$,
 (a2) the melt flow rate (MFR) is 0.1 to 10 g/10 minutes,
 (a3) the flow activation energy (Ea) is less than 50 kJ/mol,
Component (B): an ethylene-α-olefin copolymer satisfying all of the following requirements (b1) to (b3):
 (b1) the density is 890 to 925 kg/m$^3$,
 (b2) the intrinsic viscosity [η] measured in a tetralin solution is 4 to 15 dL/g,
 (b3) the flow activation energy (Ea) is less than 50 kJ/mol.

2 Claims, No Drawings

ETHYLENE BASED POLYMER COMPOSITION AND FILM

TECHNICAL FIELD

The present invention relates to an ethylene based polymer composition and a film.

BACKGROUND ART

As a wrapping material used for wrapping of foods, medicinal products, daily groceries and the like, films and sheets obtained by extrusion-molding an ethylene based polymer are often used. Among ethylene based polymers, a linear copolymer composed of ethylene and α-olefin, so called linear low density polyethylene, is excellent in impact strength as compared with a high pressure low density polyethylene. Thus, a wrapping material composed of a linear low density polyethylene can be made thinner as compared with a wrapping material composed of a high pressure low density polyethylene.

In contrast, a linear low density polyethylene is sometimes poor in transparency as compared with a high pressure low density polyethylene. Since some wrapping materials need transparency, there are various investigations on a method for improving the transparency of a linear low density polyethylene. For example, there is suggested a polymer composition obtained by blending 5 to 30% by weight of a high pressure low density polyethylene into a linear low density polyethylene (Japanese Patent Publication of Examined Application (JP-B) No. 62-3177, Japanese Patent Application Laid-Open (JP-A) No. 11-181173).

However, in the above-described polymer composition, though transparency is improved by blending a high pressure low density polyethylene, impact resistance thereof significantly lowers in some cases, that is, the above-described polymer composition is not necessarily fully satisfactory.

DISCLOSURE OF THE INVENTION

Under such conditions, the present invention solves the problem as described above and provides an ethylene based polymer composition having transparency enhanced without excessively lowering impact resistance of a linear low density polyethylene, and a film obtained by extrusion-molding the polymer composition.

In a first aspect, the present invention relates to an ethylene based polymer composition comprising the following component (A) and the following component (B) wherein the content of the component (B) is 0.1 to 20 parts by weight per 100 parts by weight of the component (A):

Component (A): an ethylene-α-olefin copolymer satisfying all of the following requirements (a1) to (a3):
  (a1) the density is 890 to 925 kg/m$^3$,
  (a2) the melt flow rate (MFR) is 0.1 to 10 g/10 minutes,
  (a3) the flow activation energy (Ea) is less than 50 kJ/mol,
Component (B): an ethylene-α-olefin copolymer satisfying all of the following requirements (b1) to (b3):
  (b1) the density is 890 to 925 kg/m$^3$,
  (b2) the intrinsic viscosity [η] measured in a tetralin solution is 4 to 15 dL/g,
  (b3) the flow activation energy (Ea) is less than 50 kJ/mol.

In a second aspect, the present invention relates to a film obtained by extrusion-molding the above-described ethylene based polymer composition.

EMBODIMENTS FOR CARRYING OUT THE INVENTION

The component (A) ethylene-α-olefin copolymer is a copolymer containing a monomer unit based on ethylene and a monomer unit based on α-olefin. The α-olefin includes propylene, 1-butene, 1-pentene, 1-hexene, 1-heptene, 1-octene, 1-nonene, 1-decene, 1-dodecene, 4-methyl-1-pentene, 4-methyl-1-hexene and the like, and these may be used singly or in combination with another or more. The α-olefin is preferably an α-olefin having 3 to 20 carbon atoms, more preferably an α-olefin having 4 to 8 carbon atoms, further preferably at least one α-olefin selected from 1-butene, 1-hexene, 1-octene and 4-methyl-1-pentene.

The component (A) ethylene-α-olefin copolymer may also contain a monomer unit based on other monomer within the range not deteriorating the effect of the present invention, in addition to the above-described monomer unit based on ethylene and monomer unit based on α-olefin. Examples of the other monomer include conjugated dienes (for example, butadiene and isoprene), non-conjugated dienes (for example, 1,4-pentadiene), acrylic acid, acrylates (for example, methyl acrylate and ethyl acrylate), methacrylic acid, methacrylates (for example, methyl methacrylate and ethyl methacrylate), vinyl acetate and the like.

Examples of the component (A) ethylene-α-olefin copolymer include ethylene-1-butene copolymer, ethylene-1-hexene copolymer, ethylene-4-methyl-1-pentene copolymer, ethylene-1-octene copolymer, ethylene-1-butene1-hexene copolymer, ethylene-1-butene-4-methyl-1-pentene copolymer, ethylene-1-butene-1-octene copolymer and the like.

In the component (A) ethylene-α-olefin copolymer, the content of the monomer unit based on ethylene is usually 80 to 98% by weight with respect to the total weight (100% by weight) of the ethylene-α-olefin copolymer, and the content of the monomer unit based on α-olefin is usually 2 to 20% by weight with respect to the total weight (100% by weight) of the ethylene based polymer.

The density (unit is kg/m$^3$) of the component (A) ethylene-α-olefin copolymer is 890 to 925 kg/m$^3$. The density is preferably 900 kg/m$^3$ or more, more preferably 905 kg/m$^3$ or more, further preferably 910 kg/m$^3$ or more, from the standpoint of enhancement of rigidity. From the standpoint of enhancement of transparency and impact strength, it is preferably 920 kg/m$^3$ or less. The density is measured according to an underwater substitution method defined in JIS K7112-1980 after carrying out annealing described in JIS K6760-1995.

The melt flow rate (MFR; unit is g/10 minutes) of the component (A) ethylene-α-olefin copolymer is 0.1 to 10 g/10 minutes. The MFR is preferably 0.5 g/10 minutes or more, more preferably 0.8 g/10 minutes or more, from the standpoint of lowering of extrusion load in molding processing. From the standpoint of enhancement of impact strength, it is preferably 5 g/10 minutes or less. The melt flow rate is a value measured by a method A under conditions of a temperature of 190° C. and a load of 21.18 N according to a method defined in JIS K7210-1995.

The component (A) ethylene-α-olefin copolymer is a polymer of linear molecular chain or a polymer of substantially linear polymer as the present invention, and its flow activation energy (Ea; unit is kJ/mol) is less than 50 kJ/mol. The Ea is preferably 40 kJ/mol or less, more preferably 35 kJ/mol or less, from the standpoint of enhancement of transparency and impact strength.

The flow activation energy (Ea) is a numerical value calculated according to an Arrhenius type equation from a shift factor ($a_T$) in making a master curve showing the dependency of melt complex viscosity (unit: Pa·sec) at 190° C. on angular frequency (unit: rad/sec), based on the temperature-time superposition principle, and is a value obtained by a method described below. That is, melt complex viscosity-angular frequency curves of ethylene-α-olefin copolymer at four temperatures (T, unit: ° C.) including 190° C. among temperatures of 130° C., 150° C., 170° C., 190° C. and 210° C. are superposed on a melt complex viscosity-angular frequency curve of the ethylene based copolymer at 190° C., for each melt complex viscosity-angular frequency curve at each temperature (T), based on the temperature-time superposition theory, thereby obtaining shift factors ($a_T$) at respective temperatures (T), and a primary approximation formula (the following formula (I)) of [ln ($a_T$)] and [1/(T+273.16)] is calculated by a least square method from respective temperatures (T) and shift factors ($a_T$) at respective temperatures (T). Then, Ea is obtained from the inclination m of the primary formula and the following formula (II).

$$\ln(a_T) = m(1/(T+273.16)) + n \quad (I)$$

$$Ea = |0.008314 \times m| \quad (II)$$

$a_T$: shift factor
Ea: flow activation energy (unit: kJ/mol)
T: temperature (unit: ° C.)

In the above-described calculation, a commercially available calculation software may be used, and the commercially available calculation software includes Rhios V.4.4.4 manufactured by Rheometrics, and the like.

The shift factor ($a_T$) is move amount when melt complex viscosity-angular frequency double logarithm curves at respective temperatures (T) are moved to log(Y)=−log(X) axis direction (here, Y axis represents melt complex viscosity, X axis represents angular frequency) and superposed on a melt complex viscosity-angular frequency curve at 190° C., and in this superposition, for the melt complex viscosity-angular frequency double logarithm curves at respective temperatures (T), the angular frequency is moved by $a_T$-fold and the melt complex viscosity is moved by $1/a_T$-fold.

The correlation coefficient in obtaining a primary approximation formula (I) by a least square method obtained from shift factors at four temperatures including 190° C. among 130° C., 150° C., 170° C., 190° C. and 210° C. and from the temperatures is usually 0.99 or more.

Measurement of the above-described melt complex viscosity-angular frequency curve uses a viscoelasticity measuring apparatus (for example, Rheometrics Mechanical Spectrometer RMS-800 manufactured by Rheometrics, and the like), and usually carried out under conditions of geometry: parallel plate, plate diameter: 25 mm, plate interval: 1.2 to 2 mm, strain: 5%, and angular frequency: 0.1 to 100 rad/sec. The measurement is carried out under a nitrogen atmosphere, and it is preferable to previously blend a suitable amount (for example, 1000 ppm) of an antioxidant into the measurement sample.

The component (A) ethylene-α-olefin copolymer is produced by copolymerizing ethylene and α-olefin by a known polymerization method such as a liquid phase polymerization method, slurry polymerization method, gas phase polymerization method, high pressure ion polymerization method and the like using a known olefin polymerization catalyst such as Ziegler catalysts, metallocene catalysts (preferably, catalysts using non-crosslinked metallocene complexes) and the like. These polymerization methods may be batch-wise or continuous, and two or more multi-stage polymerization methods may also be used. Furthermore, commercially available correspondent products may also be used.

The component (B) ethylene-α-olefin copolymer is a copolymer containing a monomer unit based on ethylene and a monomer unit based on α-olefin. The α-olefin includes propylene, 1-butene, 1-pentene, 1-hexene, 1-heptene, 1-octene, 1-nonene, 1-decene, 1-dodecene, 4-methyl-1-pentene, 4-methyl-1-hexene and the like, and these may be used singly or in combination with another or more. The α-olefin is preferably an α-olefin having 3 to 20 carbon atoms, more preferably an α-olefin having 4 to 8 carbon atoms, further preferably at least one α-olefin selected from 1-butene, 1-hexene, and 4-methyl-1-pentene.

The component (B) ethylene-α-olefin copolymer may also contain a monomer unit based on other monomer within the range not deteriorating the effect of the present invention, in addition to the above-described monomer unit based on ethylene and monomer unit based on α-olefin. Examples of the other monomer include conjugated dienes (for example, butadiene and isoprene), non-conjugated dienes (for example, 1,4-pentadiene), acrylic acid, acrylates (for example, methyl acrylate and ethyl acrylate), methacrylic acid, methacrylates (for example, methyl methacrylate and ethyl methacrylate), vinyl acetate and the like.

Examples of the component (B) ethylene-α-olefin copolymer include ethylene-1-butene copolymer, ethylene-1-hexene copolymer, ethylene-4-methyl-1-pentene copolymer, ethylene-1-octene copolymer, ethylene-1-butene1-hexene copolymer, ethylene-1-butene-4-methyl-1-pentene copolymer, ethylene-1-butene-1-octene copolymer and the like. Preferable are ethylene-1-butene copolymer, ethylene-1-hexene copolymer, ethylene-4-methyl-1-pentene copolymer and ethylene-1-butene-1-hexene copolymer.

In the component (B) ethylene-α-olefin copolymer, the content of the monomer unit based on ethylene is usually 50 to 99.5% by weight, preferably 80 to 99% by weight with respect to the total weight (100% by weight) of the ethylene-α-olefin copolymer. The content of the monomer unit based on α-olefin is usually 0.5 to 50% by weight, preferably 1 to 20% by weight with respect to the total weight (100% by weight) of the ethylene based polymer.

The density (unit is $kg/m^3$) of the component (B) ethylene-α-olefin copolymer is 890 to 925 $kg/m^3$. The density is preferably 890 $kg/m^3$ or more, more preferably 900 $kg/m^3$ or more, from the standpoint of enhancement of rigidity. From the standpoint of enhancement of transparency and impact strength, it is preferably 920 $kg/m^3$ or less, more preferably 915 $kg/m^3$ or less. The density is measured according to an underwater substitution method defined in JIS K7112-1980 after carrying out annealing described in JIS K6760-1995.

The intrinsic viscosity ([η]; unit is dL/g) of the component (B) ethylene-α-olefin copolymer in a tetralin solution is 4 to 15 g/10 minutes. The [η] is preferably 5 dL/g or more, more preferably 6 dL/g or more, from the standpoint of enhancement of transparency. From the standpoint of lowering of extrusion load in molding processing, it is preferably 13 dL/g or less, more preferably 11 dL/g or less. The [η] is obtained as described below: a tetralin solution containing 2,6-di-t-butyl-p-cresol (BHT) dissolved at a concentration of 0.5 g/L (hereinafter, described as blank solution) and a solution containing a polymer dissolved in the blank solution at a concentration of 1 mg/ml (hereinafter, described as sample solution) are prepared, then, the descendent times of the blank solution and the sample solution at 135° C. are measured by an Ubbelohde viscometer, and the [η] is obtained from the descendent times according to the following formula.

$$[\eta] = 23.3 \times \log(\eta rel)$$

ηrel=descendent time of sample solution/descendent time of blank solution

The component (B) ethylene-α-olefin copolymer has a flow activation energy (Ea; unit is kJ/mol) of less than 50 kJ/mol. The Ea is preferably 40 kJ/mol or less, more preferably 35 kJ/mol or less, from the standpoint of enhancement of transparency and impact strength. The Ea is measured by the above-described method.

It is preferable that the crystallization temperature of the component (B) ethylene-α-olefin copolymer (TcB; unit is ° C.) and the crystallization temperature of the component (A) ethylene-α-olefin copolymer (TcA; unit is ° C.) satisfy a relation of the following formula (2), from the standpoint of enhancement of transparency.

$$TcB \leq TcA+3 \quad (2)$$

The crystallization temperatures of the component (A) ethylene-α-olefin copolymer and the component (B) ethylene-α-olefin copolymer represent a temperature of a peak of maximum height in an exothermic heat flow curve measured by a differential scanning calorimeter. The exothermic heat flow curve is measured as described below: a sample is heated up to 150° C., kept at 150° C. for 5 minutes, the temperature is lowered from 150° C. to 25° C. at a rate of 10° C./min, kept at 25° C. for 5 minutes, the temperature is raised from 25° C. to 150° C. at a rate of 10° C./min, and kept at 150° C. for 5 minutes, then, the temperature is lowered from 150° C. to 25° C. at a rate of 10° C./min.

The component (B) ethylene-α-olefin copolymer is produced by copolymerizing ethylene and α-olefin by a known polymerization method such as a liquid phase polymerization method, slurry polymerization method, gas phase polymerization method, high pressure ion polymerization method and the like using a known olefin polymerization catalyst such as Ziegler catalysts, metallocene catalysts (preferably, catalysts using metallocene complexes having a ligand containing a (substituted) cyclopentadienyl group and a (substituted) fluorenyl group connected via a cross-linking group such as an alkylene group, silylene group and the like) and the like. These polymerization methods may be batch-wise or continuous. Furthermore, commercially available correspondent products may also be used.

The ethylene based polymer composition of the present invention contains a component (A) and a component (B). The content of the component (B) is 0.1 to 20 parts by weight with respect to 100 parts by weight of the component (A). The content of the component (B) is preferably 0.3 parts by weight or more, more preferably 0.5 parts by weight or more with respect to 100 parts by weight of the component (A), from the standpoint of enhancement of transparency. When the content of the component (B) is too high, transparency lowers and extrusion load in molding processing increases in some cases. The content of the component (B) is preferably 15 parts by weight or less, more preferably 10 parts by weight or less with respect to 100 parts by weight of the component (A).

The ethylene based polymer composition of the present invention may contain known additives, if necessary. Examples of the additive include an antioxidant, weather-proofing agent, lubricant, anti-blocking agent, antistatic agent, anti-fogging agent, dropless agent, pigment, filler and the like.

The method of producing an ethylene based polymer composition of the present invention includes a method in which a component (A) and a component (B) are produced separately, then, mixed, a method in which a composition of a component (A) and a component (B) is produced by a polymerization reaction, and other methods.

As the method in which a component (A) and a component (B) are produced separately, then, mixed, there are mentioned a method of performing a melt kneading treatment by an extruder such as (1) an extruder equipped with an elongation flow kneading die (for example, die described in U.S. Pat. No. 5,451,106 developed by Utracki, et al., and the like), (2) an extruder equipped with an counter-rotating twin screw having a gear pump (preferably, having a retention part between a screw part and die), or the like, a method in which a solvent such as ortho-dichlorobenzene, xylene or the like is heated up to a temperature at which the resin is dissolved, the solution is mixed, then, precipitation is caused with a poor solvent such as ethanol and the like, and the precipitate is recovered, and other method.

As the method of producing a composition of a component (A) and a component (B) by polymerization, there are mentioned methods of polymerizing using two olefin polymerization catalysts, for example, a method of polymerizing using a Ziegler catalyst and a metallocene catalyst in combination, and methods of polymerizing using two metallocene complexes. Further mentioned are multi-stage polymerization methods, for example, a method in which a component (B) is produced in former stage polymerization and a component (A) is produced in latter stage polymerization.

The ethylene based polymer composition of the present invention is molded into a film, sheet, bottle, tray and the like by known molding methods, for example, extrusion molding methods such as a blown film molding method, flat die film molding method and the like, hollow molding methods, injection molding methods, compression molding methods and the like. As the molding method, extrusion molding methods are suitably used. It is suitable that the ethylene based polymer composition of the present invention is molded into a film and used.

The ethylene based polymer composition of the present invention is excellent in transparency and impact strength, and a molded article obtained by molding the ethylene based polymer composition is used in various applications such as food wrapping, surface protection and the like.

The present invention will be illustrated by examples and comparative examples below.

Physical properties in examples and comparative examples were measured according to the following methods.

(1) Density (Unit: kg/m$^3$)

The density was measured according to an underwater substitution method defined in JIS K7112-1980. A sample was subjected to annealing described in JIS K6760-1995.

(2) Melt Flow Rate (MFR, Unit: g/10 minutes)

The melt flow rate was measured by a method A under conditions of a load of 21.18 N and a temperature of 190° C. according to a method defined in JIS K7210-1995.

(3) Intrinsic Viscosity ([η], Unit: dL/g)

A tetralin solution containing 2,6-di-t-butyl-p-cresol (BHT) dissolved at a concentration of 0.5 g/L (hereinafter, described as blank solution) and a solution containing a polymer dissolved in the blank solution at a concentration of 1 mg/ml (hereinafter, described as sample solution) were prepared. The descendent times of the blank solution and the sample solution at 135° C. were measured by an Ubbelohde viscometer, and the [η] was obtained from the descendent times according to the following formula.

$$[\eta]=23.3 \times \log(\eta rel)$$

ηrel=descendent time of sample solution/descendent time of blank solution (4) Flow Activation Energy (Ea, Unit: kJ/mol)

The melt complex viscosity-angular frequency curves were measured at 130° C., 150° C., 170° C. and 190° C. under the following conditions using a viscoelasticity measuring apparatus (Rheometrics Mechanical Spectrometer RMS-800 manufactured by Rheometrics, and the like).

Next, a master curve of the melt complex viscosity-angular frequency curve at 190° C. was made using a calculation software Rhios V.4.4.4 available from Rheometrics from the resultant melt complex viscosity-angular frequency curves, and the flow activation energy (Ea) was obtained.

<Measurement Conditions>
Geometry: parallel plate
Plate diameter: 25 mm
Plate interval: 1.5 to 2 mm
Strain: 5%
Angular frequency: 0.1 to 100 rad/sec
Measurement atmosphere: nitrogen (5) Crystallization Temperature (Unit: ° C.)

The crystallization temperature was measured using a differential scanning calorimeter (input compensation type, PYRIS Diamond DSC manufactured by PERKIN-ELMER). 8 to 10 mg of a sample was packed in an aluminum pan and heated up to 150° C., kept at 150° C. for 5 minutes, then, the temperature was lowered from 150° C. to 25° C. at a rate of 10° C./min, kept at 25° C. for 5 minutes, then, the temperature was raised from 25° C. to 150° C. at a rate of 10° C./min, and kept at 150° C. for 5 minutes, then, the temperature was lowered from 150° C. to 25° C. at a rate of 10° C./min, a exothermic heat flow curve was measured in this procedure. The temperature of a peak of maximum height in the exothermic heat flow curve was recognized as crystallization temperature.

(6) Molecular Weight Distribution (Mw/Mn)

The weight average molecular weight (Mw) and the number average molecular weight (Mn) were measured under the following conditions (1) to (8) using gel permeation chromatograph (GPC), and the molecular weight distribution (Mw/Mn) was obtained. The base line on the chromatogram was a straight line obtained by connecting a point in stable horizontal region of sufficiently shorter retention time than emergence of sample elution peak and a point in stable horizontal region of sufficiently longer retention time than observance of solvent elution peak.

(1) Apparatus: Waters 150C manufactured by Waters
(2) Separation column: two pieces of TOSOH TSKgel GMH6-HT
(3) Measuring temperature: 140° C.
(4) Carrier: ortho-dichlorobenzene
(5) Flow rate: 1.0 mL/min
(6) Injection volume: 500 μL
(7) Detector: differential refractometer
(8) Molecular weight reference material: standard polystyrene (7) Transparency of film The haze of a film was measured according to ASTM1 003. The smaller the haze, the more excellent the transparency of a film.

(8) Impact strength of film

A film impact tester equipped with a constant temperature vessel (manufactured by Toyo Seiki Seisaku-Sho Ltd.) was used, the penetration portion at the peak of pendulum was made into half sphere of 15 mmφ and the effective test piece area was 50 mmφ circle, and the impact piercing strength of the film was measured at 23° C.

Example 1

(1) Preparation of Component (B)

Into a nitrogen purged 200 L reaction vessel equipped with a stirrer and a baffle plate was placed 80 L of hexane, 20.6 kg of tetraethoxysilane and 2.2 kg of tetrabutoxytitanium, and the mixture was stirred. Next, into the above-described stirred mixture, 50 L of a dibutyl ether solution of butyl magnesium chloride (concentration: 2.1 mol/L) was dropped over 4 hours while maintaining the temperature of the reaction vessel at 5° C. After completion of dropping, the mixture was stirred at 5° C. for 1 hour, further at 20° C. for 1 hour, and filtrated to obtain a solid component. Next, the resultant solid component was washed with 70 L of toluene three times, and 63 L of toluene was added to the solid component, obtaining a slurry.

A reaction vessel having an inner volume of 210 L equipped with a stirrer was purged with nitrogen, and the toluene slurry of the solid component was charged in the reaction vessel, and 14.4 kg of tetrachlorosilane and 9.5 kg of di(2-ethylhexyl) phthalate were added, and the mixture was stirred at 105° C. for 2 hours. Then, solid-liquid separation was performed, and the resultant solid was washed with 90 L of toluene three times at 95° C. 63 L of toluene was added to the solid, the temperature was raised to 70° C., 13.0 kg of TiCl$_4$ was added and the mixture was stirred at 105° C. for 2 hours. Then, solid-liquid separation was performed, and the resultant solid was washed with 90 L of toluene six times at 95° C., further, washed with 90 L of hexane twice at room temperature. The solid after washing was dried, to obtain a solid catalyst component.

An autoclave having an inner volume of 3 L equipped with a stirrer was dried sufficiently, the autoclave was evacuated, and 500 g of butane and 250 g of 1-butene were charged and the mixture was heated at 70° C. Next, ethylene was added at a partial pressure of 1.0 MPa. 5.7 mmol of triethylaluminum and 10.7 mg of the solid catalyst component were pressed in by argon, and polymerization thereof was initiated. Ethylene was fed continuously to give constant pressure, and polymerization was carried out at 70° C. for 180 minutes. By the polymerization, an ethylene-1-butene copolymer (hereinafter, described as B1) was obtained. The physical properties of the polymer B1 are shown in Table 1.

(2) Preparation of Ethylene Based Polymer Composition

A mixture prepared by mixing 98 parts by weight an ethylene-1-butene copolymer (manufactured by Sumitomo Chemical Co., Ltd., Sumikathene-L FS240; hereinafter, described as A1. Physical properties are shown in Table 1) and 2 parts by weight the polymer B1 and 2,6-di-t-butyl-p-cresol (BHT) in an amount of 1 part by weight with respect to 100 parts by weight of the total weight of (A1) and (B1) (the polymer (B1) is 2 parts by weight per 100 parts by weight of the polymer (A1)) was dissolved in xylene of 120° C. so the total concentration of the polymer (A1) and the polymer (B1) was 2% by weight, and the mixture was stirred for 1.5 hours. Next, the xylene solution was dropped into methanol, to obtain a precipitate. This precipitate is an ethylene based polymer composition.

(3) Film Processing

Into the ethylene based polymer composition, 1000 ppm of an antioxidant (manufactured by Sumitomo Chemical Co., Ltd., Sumilizer GP) and 800 ppm of calcium stearate were blended, and a blown film having a thickness of 20 μm was molded by a blown film molding machine (manufactured by Randcastle, single screw extruder (diameter: 15 mmφ), dice (die diameter: 125 mmφ, lip gap: 2.0 mm)) under processing conditions of a processing temperature of 200° C., an extrusion amount of 150 g/hr, a frost line height of 20 mm, a blow ratio of 2.0 and a film drawing speed of 2.2 m/min. The results of evaluation of the physical properties of the resultant film are shown in Table 2.

Example 2

The same procedure as in Example 1 was carried out excepting that the amount of the polymer A1 was 99 parts by weight and the amount of the polymer B1 was 1 part by weight in preparation of the ethylene based polymer composition (the amount of the polymer (B1) is 1 part by weight per 100 parts by weight the polymer (A1)). The results of evaluation of the physical properties of the resultant film are shown in Table 2.

Example 3

The same procedure as in Example 1 was carried out excepting that the amount of the polymer A1 was 99.5 parts by weight and the amount of the polymer B1 was 0.5 parts by weight in preparation of the ethylene based polymer composition (the amount of the polymer (B1) is 0.5 parts by weight per 100 parts by weight the polymer (A1)). The results of evaluation of the physical properties of the resultant film are shown in Table 2.

Example 4

The same procedure as in Example 1 was carried out excepting that the amount of the polymer A1 was 95 parts by weight and the amount of the polymer B1 was 5 parts by weight in preparation of the ethylene based polymer composition (the amount of the polymer (B1) is 5.3 parts by weight per 100 parts by weight the polymer (A1)). The results of evaluation of the physical properties of the resultant film are shown in Table 2.

Comparative Example 1

The same film processing as in Example 1 was carried out excepting that the polymer A1 was used instead of the ethylene based polymer composition. The results of evaluation of the physical properties of the resultant film are shown in Table 2.

Comparative Example 2

(1) Preparation of Ethylene Based Polymer Composition

A mixture prepared by mixing 80 parts by weight of the polymer A1, 20 parts by weight of a high pressure low density polyethylene (manufactured by Sumitomo Chemical Co., Ltd., Sumikathene F410-7; hereinafter, described as C1. Physical properties are shown in Table 1) and 2,6-di-t-butyl-p-cresol (BHT) in an amount of 1 part by weight with respect to 100 parts by weight of the total weight of (A1) and (C1) (the polymer (C1) is 25 parts by weight per 100 parts by weight of the polymer (A1)) was dissolved in xylene of 120° C. so the total concentration of the polymer (A1) and the polymer (C1) was 2% by weight, and the mixture was stirred for 1.5 hours. Next, the xylene solution was dropped into methanol, to obtain a precipitate. This precipitate is an ethylene based polymer composition.

(2) Film Processing

Into the ethylene based polymer composition, 1000 ppm of an antioxidant (manufactured by Sumitomo Chemical Co., Ltd., Sumilizer GP) and 800 ppm of calcium stearate were blended, then, the ethylene based polymer composition was molded into a blown film having a thickness of 20 µm by a blown film molding machine (manufactured by Randcastle, single screw extruder (diameter: 0.5 inchϕ), dice (die diameter: 0.625 inchϕ, lip gap: 0.03 inch)) under processing conditions of a processing temperature of 200° C., an extrusion amount of 170 g/hr, a frost line height of 20 mm, a blow ratio of 2.0 and a film drawing speed of 2.0 m/min. The results of evaluation of the physical properties of the resultant film are shown in Table 2.

Comparative Example 3

The same procedure as in Example 1 was carried out excepting that the amount of the polymer (A1) was 98 parts by weight and 2 parts by weight of a high molecular weight high density polyethylene (manufactured by Mitsui Chemicals Inc., Hi-Zex Million 145M; hereinafter, described as B2. Physical properties are shown in Table 1) was used instead of the polymer B1, in preparation of the ethylene based polymer composition (the amount of the polymer (B2) is 2 parts by weight per 100 parts by weight the polymer (A1)). The results of evaluation of the physical properties of the resultant film are shown in Table 2.

Comparative Example 4

The same procedure as in Example 1 was carried out excepting that 90 parts by weight of a linear low density polyethylene (manufactured by Sumitomo Chemical Co., Ltd., Sumikathene-L GA801; described as A2. Physical properties are shown in Table 1) was used instead of the polymer (A1) and the amount of the polymer (B1) was 10 parts by weight, in preparation of the ethylene based polymer composition (the amount of the polymer (B1) is 11 parts by weight per 100 parts by weight the polymer (A2)). The results of evaluation of the physical properties of the resultant film are shown in Table 2.

TABLE 1

| Polymer | Density (kg/m$^3$) | MFR (g/10 minutes) | [η] (dL/g) | Ea (kJ/mol) | Crystallization temperature (° C.) | Mw/Mn |
|---|---|---|---|---|---|---|
| A1 | 920 | 2 | 1.5 | 30 | 107 | 3.3 |
| A2 | 920 | 20 | — | 29 | 102 | 5.9 |
| B1 | 910 | <0.01 | 9.1 | 25 | 108 | 15 |
| B2 | 933 | <0.01 | 7.7 | — | 116 | 5.1 |
| C1 | 922 | 5 | — | 62 | 97 | 3.8 |

TABLE 2

| | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Polymer composition | | | | | | | | | |
| A1 | parts | 98 | 99 | 99.5 | 95 | 100 | 80 | 98 | — |
| A2 | by | — | — | — | — | — | — | — | 90 |
| B1 | weight | 2 | 1 | 0.5 | 5 | — | — | — | 10 |
| B2 | | — | — | — | — | — | — | 2 | — |
| C1 | | — | — | — | — | — | 20 | — | — |

TABLE 2-continued

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Film physical properties |  |  |  |  |  |  |  |  |
| Haze (%) | 7.7 | 10.1 | 11.8 | 11.9 | 43.0 | 7.0 | 16.3 | 53 |
| Impact piercing strength (kg · cm/mm) | 90 | 88 | 110 | 158 | 78 | 32 | 104 | 27 |

INDUSTRIAL APPLICABILITY

The present invention can provide an ethylene based polymer composition having transparency enhanced without excessively lowering impact resistance of a linear low density polyethylene, and a film obtained by extrusion-molding the polymer composition.

The invention claimed is:

1. An ethylene based polymer composition comprising the following component (A) and the following component (B) wherein the content of the component (B) is 0.1 to 20 parts by weight per 100 parts by weight of the component (A):

Component (A): an ethylene-α-olefin copolymer satisfying all of the following requirements (a1) to (a3):
  (a1) the density is 890 to 925 kg/m$^3$,
  (a2) the melt flow rate (MFR) is 0.1 to 10 g/10 minutes,
  (a3) the flow activation energy (Ea) is less than 50 kJ/mol, Component (B): an ethylene-α-olefin copolymer satisfying all of the following requirements (b1) to (b3):
  (b1) the density is 890 to 925 kg/m$^3$,
  (b2) the intrinsic viscosity [η] measured in a tetralin solution is 5 to 15 dL/g,
  (b3) the flow activation energy (Ea) is less than 50 kJ/mol.

2. A film obtained by extrusion-molding the ethylene based polymer composition as described in claim 1.

* * * * *